United States Patent
Tae et al.

(10) Patent No.: US 9,891,490 B2
(45) Date of Patent: Feb. 13, 2018

(54) LIQUID CRYSTAL DISPLAY DEVICE

(71) Applicant: Samsung Display Co., Ltd., Yongin (KR)

(72) Inventors: Chang-Il Tae, Yongin (KR); Eun-Kil Park, Yongin (KR); Seung-Ho Yang, Yongin (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 121 days.

(21) Appl. No.: 14/793,145

(22) Filed: Jul. 7, 2015

(65) Prior Publication Data

US 2016/0116810 A1 Apr. 28, 2016

(30) Foreign Application Priority Data

Oct. 28, 2014 (KR) .................. 10-2014-0147680

(51) Int. Cl.
*G02F 1/1362* (2006.01)
*G02F 1/1343* (2006.01)

(52) U.S. Cl.
CPC .... *G02F 1/13624* (2013.01); *G02F 1/134309* (2013.01); *G02F 2001/134381* (2013.01)

(58) Field of Classification Search
CPC ......... G02F 1/134336; G02F 1/136286; G02F 1/1368; G02F 1/13624; G02F 1/134309; G02F 2001/134381
See application file for complete search history.

(56) References Cited

U.S. PATENT DOCUMENTS

| | | | |
|---|---|---|---|
| 2006/0038930 A1* | 2/2006 | Kaneko | G02F 1/133504 349/41 |
| 2009/0279034 A1 | 11/2009 | Shoraku et al. | |
| 2010/0123845 A1 | 5/2010 | Kim et al. | |
| 2010/0231845 A1 | 9/2010 | Seong et al. | |
| 2011/0051059 A1 | 3/2011 | Kang et al. | |
| 2011/0157537 A1* | 6/2011 | Chen | G02F 1/133707 349/158 |
| 2013/0002625 A1* | 1/2013 | Liao | G02F 1/134309 345/205 |

(Continued)

FOREIGN PATENT DOCUMENTS

| | | |
|---|---|---|
| KR | 1020100054344 | 5/2010 |
| KR | 1020110024510 | 3/2011 |
| KR | 1020130091218 | 8/2013 |

*Primary Examiner* — Charles Chang
(74) *Attorney, Agent, or Firm* — Cantor Colburn LLP

(57) ABSTRACT

A liquid crystal display device includes a first substrate comprising a pixel area, a second substrate having a common electrode, and a liquid crystal layer arranged between the first and second substrates, where the first substrate includes a first pixel electrode which is arranged on the pixel area and in which a diamond shaped open unit is defined, and a plate shaped second pixel electrode arranged on the first pixel electrode, the first pixel electrode having first and second sides parallel to one side of the pixel area, third and fourth sides extending from one side of the first and second sides, inclined against the first and second sides, and parallel to each other, and fifth and sixth sides that connect the first and second sides with the third and fourth sides, and are parallel to each other, and the second pixel electrode includes a cross-shaped stem unit.

14 Claims, 6 Drawing Sheets

(56) References Cited

U.S. PATENT DOCUMENTS

2013/0077010 A1\* 3/2013 Takeda .............. G02F 1/134363
    349/43
2013/0201432 A1   8/2013 Yun et al.
2015/0293546 A1\* 10/2015 Tanaka ................. G02F 1/1368
    327/541

\* cited by examiner

LIQUID CRYSTAL DISPLAY DEVICE

This application claims priority to Korean Patent Application No. 10-2014-0147680, filed on Oct. 28, 2014, and all the benefits accruing therefrom under 35 U.S.C. §119, the entire contents of which are incorporated herein by reference in their entirety.

BACKGROUND

Field

Various embodiments of the invention relate to a liquid crystal display ("LCD") device, and more particularly, to an LCD device with improved displaying quality.

Description of Related Art

In general, an image realized by a liquid crystal display ("LCD") device has a limited viewing angle depending on an angle from which the image is viewed due to anisotropy characteristics of liquid crystal, and a phenomenon of the image being distorted occurs. Such distortion of image may be overcome by a pattern of a pixel electrode and common electrode.

When an electric field is applied to the liquid crystal, a fringe field is generated at an edge area of a pattern electrode where liquid crystal molecules are aligned in a plurality of directions.

In order to resolve the problem of limited viewing angle, recently, the structure of pixel electrodes has been changed to various types.

SUMMARY

In a case of changing a structure of a pixel electrode in order to improve a viewing angle, there are limitations in manufacturing and processing technology, and a transmission rate of the liquid crystal display ("LCD") device decreases. This decrease of the transmission rate may lead to deterioration of the quality of the LCD device.

A purpose of various embodiments of the invention is to provide an LCD device with improved displaying quality.

According to an exemplary embodiment of the invention, there is provided an LCD device including a first substrate including a pixel area, a second substrate having a common electrode, and facing the first substrate, and a liquid crystal layer arranged between the first substrate and the second substrate, where the first substrate includes a first pixel electrode arranged on the pixel area, and having therein a diamond shaped open unit, and a plate shaped second pixel electrode arranged on the first pixel electrode, the first pixel electrode having first and second sides parallel to one side of the pixel area, third and fourth sides extending from one side of the first and second sides, and inclined against the first and second sides, and parallel to each other, and fifth and sixth sides that connect the first and second sides with the third and fourth sides, and are parallel to each other, and the second pixel electrode includes a first subpixel electrode that overlaps the open unit of the first pixel electrode and that includes a cross-shaped stem unit, and a plurality of first branch units extending slantly against the stem unit, and a second subpixel electrode that is arranged such that it is distanced from the first subpixel electrode in an outskirt of the first subpixel electrode, and that includes a circumference unit including the plate shape corner, and a plurality of second branch units extending slantly against the circumference unit, and connecting bars that connect the second branch units corresponding to the first and second sides.

In an exemplary embodiment, the connecting bars may extend parallel to the first and second sides, and at least a portion of the connecting bars may overlap the first and second sides. A length of the connecting bars may be equal to or greater than a length of the first and second sides.

In an exemplary embodiment, the LCD device may further include a data line extending in one direction from one side of the pixel area, and a shielding electrode overlapping the data line. The shielding electrode may include a same substance as that of the first pixel electrode.

In an exemplary embodiment, a distance between the connecting bars and the shielding electrode may be once or twice a width of the connecting bars.

In an exemplary embodiment, an edge area of the first subpixel electrode may overlap the first pixel electrode, and an inner edge area of the second subpixel electrode may overlap the first pixel electrode.

According to another embodiment of the invention, the first substrate may include a gate line arranged on a first base substrate, a data line crossing and insulated from the gate line, a plurality of thin film transistors electrically switching the gate line and the data line, a first protection film that covers the thin film transistors, a first pixel electrode arranged on the protection film, and is connected to one of the thin film transistors, a shielding electrode arranged on the protection film, and overlaps the data line to block an electric field, a second protection film that covers the first pixel electrode and the shielding electrode, and a second pixel electrode arranged on the second protection film, and is connected to another one of the thin film transistors.

According to another embodiment of the invention, there is provided an LCD device including a first substrate including a pixel area, a second substrate having a common electrode, and facing the first substrate, and a liquid crystal layer arranged between the first substrate and the second substrate, where the first substrate includes a gate line arranged on a first base substrate, a data line crossing and insulated from the gate line, a plurality of thin film transistors connected to the gate line and the data line, a first protection film that covers the thin film transistors, a first pixel electrode arranged on the protection film, and is connected to one of the thin film transistors, a shielding electrode arranged on the protection film, and overlaps the data line to block an electric field, a second protection film that covers the first pixel electrode and the shielding electrode, and a second pixel electrode arranged on the second protection film, and is connected to another one of the thin film transistors, the first pixel electrode having first and second sides parallel to one side of the pixel area, third and fourth sides extending from one side of the first and second sides, and inclined against the first and second sides, and parallel to each other, and fifth and sixth sides that connect the first and second sides with the third and fourth sides, and are parallel to each other, the shielding electrode including a same substance as that of the first pixel electrode, and a convex arranged on an area corresponding to the first and second sides.

A width of the convex may be smaller than a width of the shielding electrode, and a length of the convex may be equal to or greater than a length of the first and second sides.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
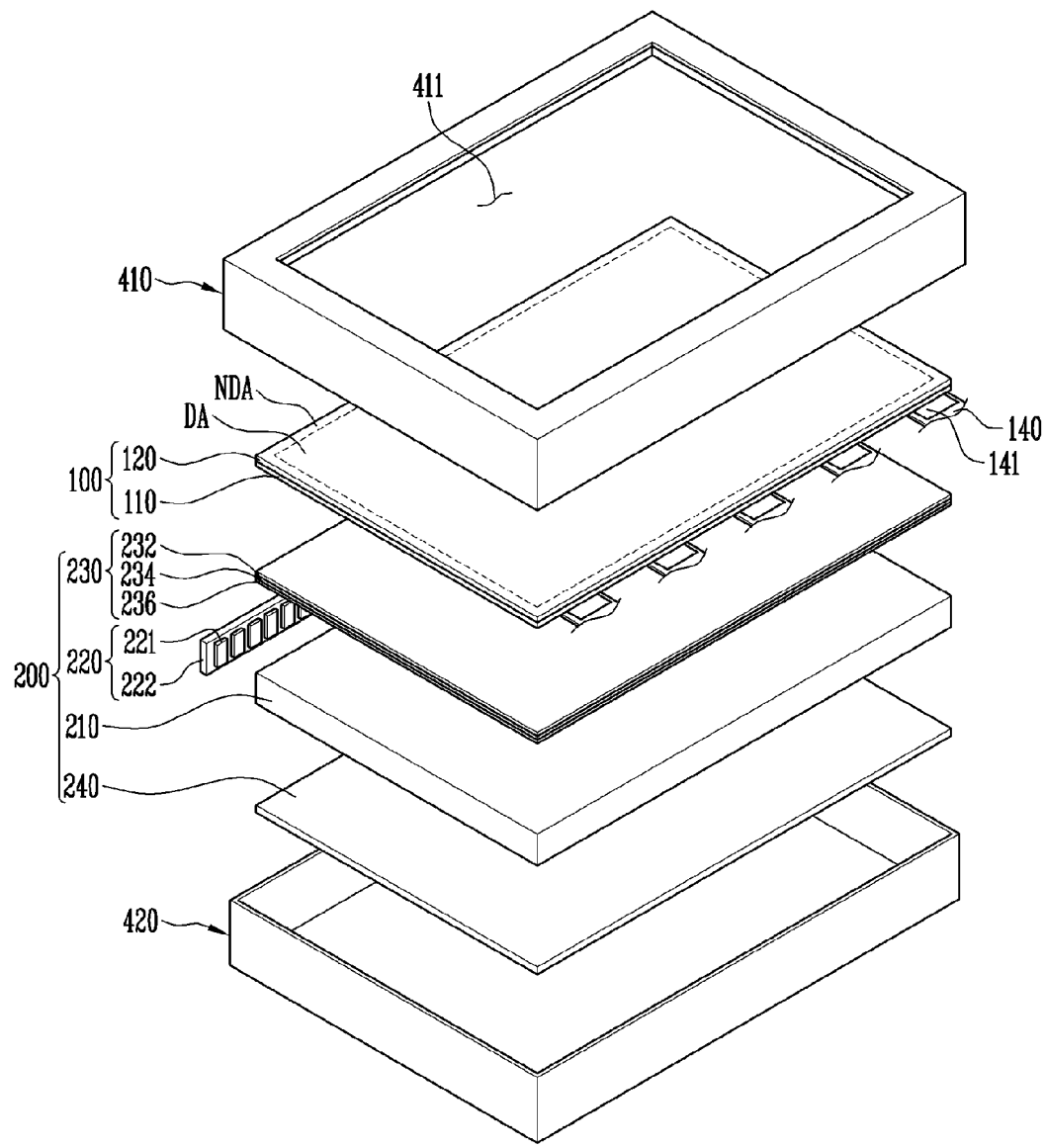
FIG. 1 is an exploded perspective view for explaining an exemplary embodiment of a liquid crystal display ("LCD") device according to the invention.

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. In an exemplary embodiment, a first component may be referred to as a second component, and a second component may be referred to as a first component and so forth without departing from the spirit and scope of the invention. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is an exploded perspective view for explaining a liquid crystal display ("LCD") device according to an exemplary embodiment of the invention.

Referring to FIG. 1, the LCD device may include an LCD panel 100, backlight unit 200, upper cover 410, and lower cover 420.

The LCD panel 100 may have a shape of a rectangular plate with a long side and a short side, and may include a display area DA that displays an image, and a non-display area NDA surrounding the display area DA. In an exemplary embodiment, the LCD panel 100 may include a first substrate 110, a second substrate 120 facing the first substrate 110, and a liquid crystal layer (not illustrated) disposed between the first substrate 110 and the second substrate 120. In an exemplary embodiment, on both surfaces of the LCD panel 100, i.e. an exterior surface of each of the first substrate 110 and the second substrate 120, a polarizing film (not illustrated) may be attached.

On the display area DA of the first substrate 110, a plurality of pixels (not illustrated) may be arranged in a matrix format. In an exemplary embodiment, each pixel may include a plurality of sub pixels, and each sub pixel may have a different color. In an exemplary embodiment, each sub pixel may be of any one color of red, green, blue, cyan, magenta, and yellow, for example. Therefore, light emitted from each sub pixel may be of any one color of red, green, blue, cyan, magenta, and yellow. In an exemplary embodiment, each pixel may have a gate line (not illustrated), a data line (not illustrated) that crosses the gate line such that the data line is insulated from the gate line, and a pixel electrode (not illustrated). In an exemplary embodiment, each pixel may be provided with a thin film transistor ("TFT") (not illustrated) that is electrically connected to the gate line and the data line, and is electrically connected correspondingly to the pixel electrode. The TFT may switch a driving signal provided to the corresponding pixel electrode side.

In an exemplary embodiment, on the non-display area NDA of the first substrate 110, a bag pattern (not illustrated) that combines the first substrate 110 and the second substrate 120 may be arranged.

The second substrate 120 may be provided with a color filter (not illustrated) that realizes a predetermined color using light provided from the backlight unit 200 and a common electrode (not illustrated) disposed on the color filter and faces the pixel electrode (not illustrated). In an exemplary embodiment, the color filter may be of any one of colors, red, green, blue, cyan, magenta, and yellow, for example, and may be provided through a process such as evaporation or coating. In the exemplary embodiment, the color filter is disposed on the second substrate 120, but the invention is not limited thereto. In another exemplary embodiment, the color filter may be disposed on the first substrate 110.

The liquid crystal layer is arranged in a certain direction by a voltage applied to the pixel electrode and the common electrode, thereby adjusting the transmission rate of the light provided from the backlight unit 200 so that the LCD panel 100 may display an image.

In the non-display area NDA, on an exterior surface of either one of the first substrate 110 and the second substrate 120, a signal input pad (not illustrated) may be arranged. The signal input pad is connected to a flexible circuit substrate 140 where a driver integrated circuit ("IC") 141 is mounted, and the flexible circuit substrate 140 may be connected to an external circuit module (not illustrated). The driver IC 141 receives various control signals from the external circuit module, and outputs a driving signal that drives the LCD panel 100 to the TFT in response to the various control signals.

The backlight unit 200 is arranged in a direction opposite to a direction in which an image is emitted from the LCD panel 100. The backlight unit 200 may include a light guide plate 210, a light source unit 220 that includes a plurality of light sources, an optical member 230, and a reflectance sheet 240.

The light guide plate 210 is positioned below the LCD panel 100, and guides the light emitted from the light source unit 220 and emits the light in the LCD panel 100 direction. Especially, the light guide plate 210 overlaps at least the display area DA of the LCD panel 100. In an exemplary embodiment, the light guide plate 210 may include an emitting surface where the light is emitted, a lower surface facing the emitting surface, and side surfaces that connect the emitting surface and the lower surface. In an exemplary embodiment, at least one of the side surfaces of the light guide plate 210 may be an incident surface that faces the light source unit 220 and where the light emitted from the light source unit 220 enters, and a side surface facing the incident surface may be a light reflex surface that reflects light.

The light source unit 220 may include a plurality of light sources 221 such as a plurality of light emitting diodes mounted on a printed circuit board ("PCB") 222.

In an exemplary embodiment, the light sources 221 may emit light of a same color. In the exemplary embodiment, the light sources 221 may emit white color light.

In an exemplary embodiment, the light sources 221 may emit light of different colors. In the exemplary embodiment, some of the light sources 221 may emit red color light, other light sources 221 may emit green light, and other light sources 221 may emit blue light, for example.

The light source unit 220 may be arranged to face at least one of the side surfaces of the light guide plate 210 to emit light, and may provide light used by the LCD panel 100 to display an image through the light guide plate 210.

The optical member 230 is provided between the light guide plate 210 and the LCD panel 100. The optical member 230 plays a role of controlling the light provided from the light source unit 220 and emitted through the light guide plate 210. In an exemplary embodiment, the optical member 230 may include a diffusion sheet 236, prism sheet 234, and protection sheet 232 laminated sequentially.

The diffusion sheet 236 plays a role of diffusing light emitted from the light guide plate 210. The prism sheet 234 plays a role of concentrating light diffused from the diffusion sheet 236 in a direction vertical to an upper plane of the LCD panel 100. Most of the light that passed the prism sheet 234 enters the LCD panel 100 vertically. The protection sheet 232 is positioned on the prism sheet 234. The protection sheet 232 protects the prism sheet 234 from impact from outside.

In the exemplary embodiment, the optical member 230 has one diffusion sheet 236, one prism sheet 234, and one protection sheet 232, but the invention is not limited thereto. The optical member 230 may include a plurality of at least one of the diffusion sheet 236, prism sheet 234, and protection sheet 232, overlapping one another, and when necessary, one of the sheets may be omitted.

The reflectance sheet 240 may be arranged below the light guide plate 210 to reflect light that is emitted from the light source unit 220 but is not provided in the LCD panel 100 direction and is leaked, thereby changing the light path towards the LCD panel 100 direction. The reflectance sheet 240 may include a substance that reflects light. The reflectance sheet 240 is provided on the lower cover 420, and reflects the light generated from the light source unit 220. As a result, the reflectance sheet 240 increases the amount of light being provided towards the LCD panel 100 side.

In the exemplary embodiment, the light source unit 220 is arranged such that it provides light in a side surface direction of the light guide plate 210, but the invention is not limited thereto. In an exemplary embodiment, the light source unit 220 may be arranged such that it provides light in the lower surface direction of the light guide plate 210. In an exemplary embodiment, the light guide plate 210 may be omitted from the backlight unit 200, and the light source unit 220 may be arranged below the LCD panel 100, so that light emitted from the light source unit 220 is directly provided to the LCD panel 100.

The upper cover 410 is provided above the LCD panel 100. A display window 411 that exposes the display area DA of the LCD panel 100 is defined in the upper cover 410. The upper cover 410 is combined with the lower cover 420, and supports a front surface edge of the LCD panel 100.

The lower cover 420 is provided below the backlight unit 200. A space for accommodating the LCD panel 100 and the backlight unit 200 may be defined in the lower cover 420. In an exemplary embodiment, the lower cover 420 may be combined with the upper cover 410, and may accommodate and support the LCD panel 100 and the backlight unit 200 in its inner space.

Figure 2:
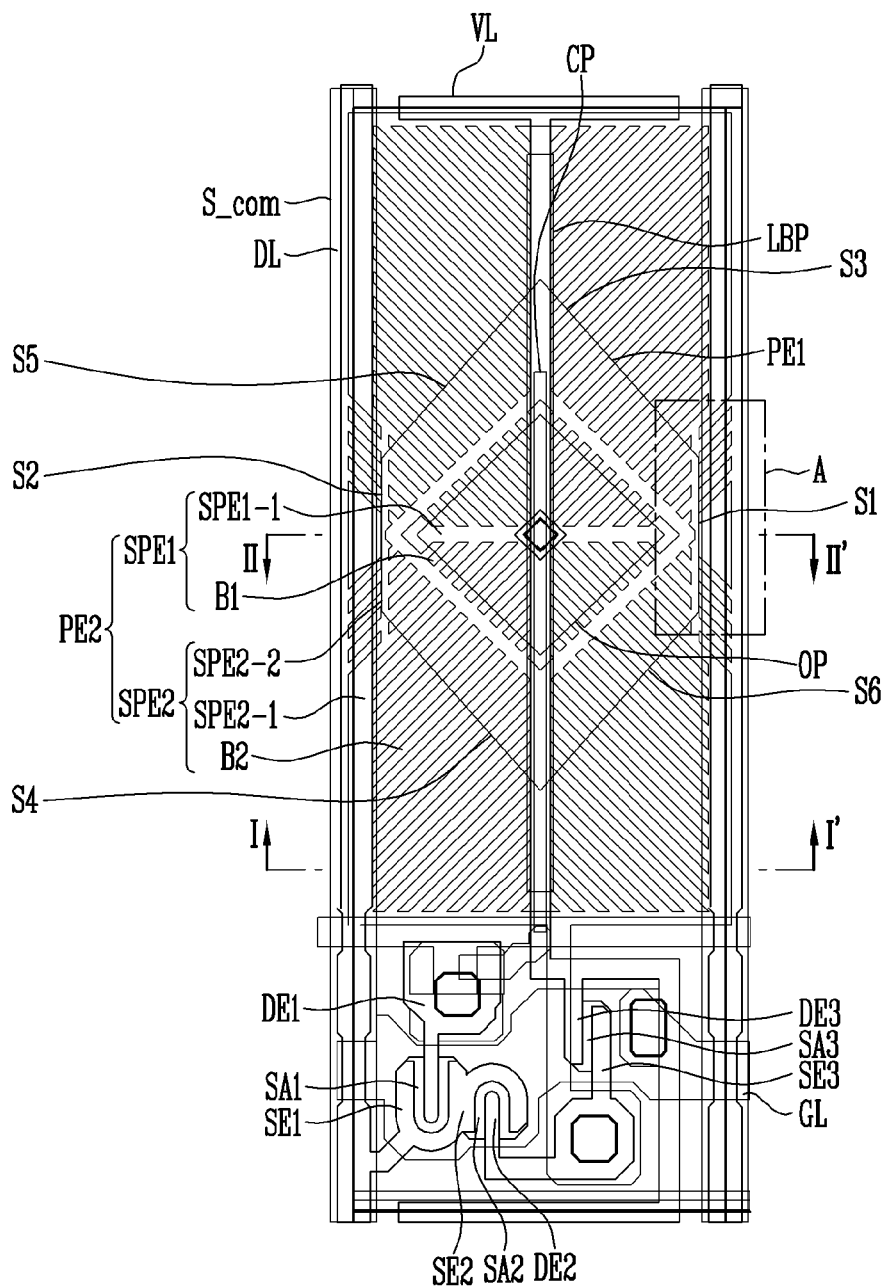
FIG. 2 is a plane view for explaining a pixel of an LCD panel illustrated in FIG. 1.
Figure 3:
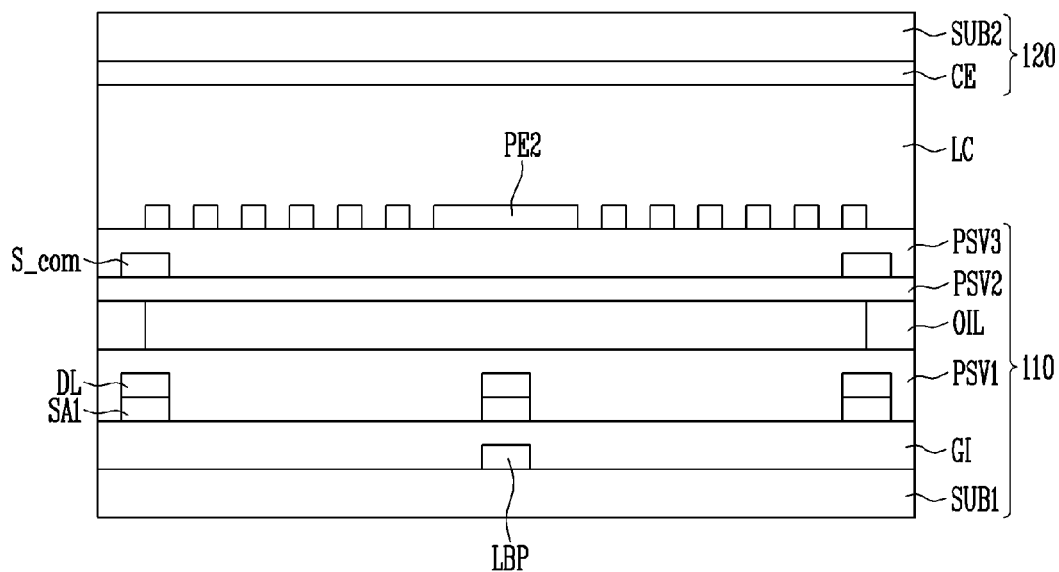
FIG. 3 is a cross-sectional view along line I-I' in FIG. 2.
Figure 4:
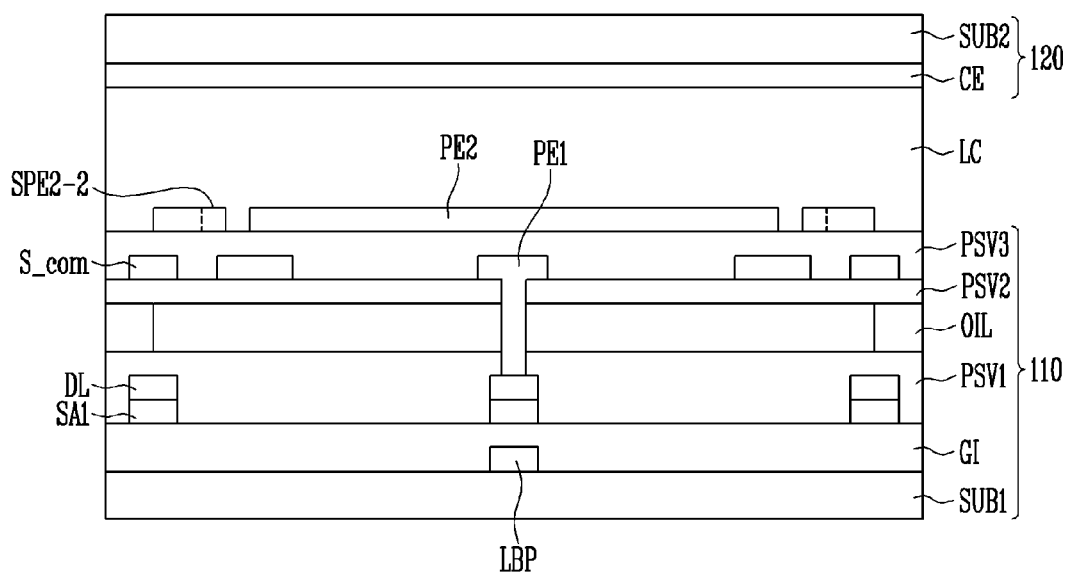
FIG. 4 is a cross-sectional view along line II-II' in FIG. 2.
Figure 5:
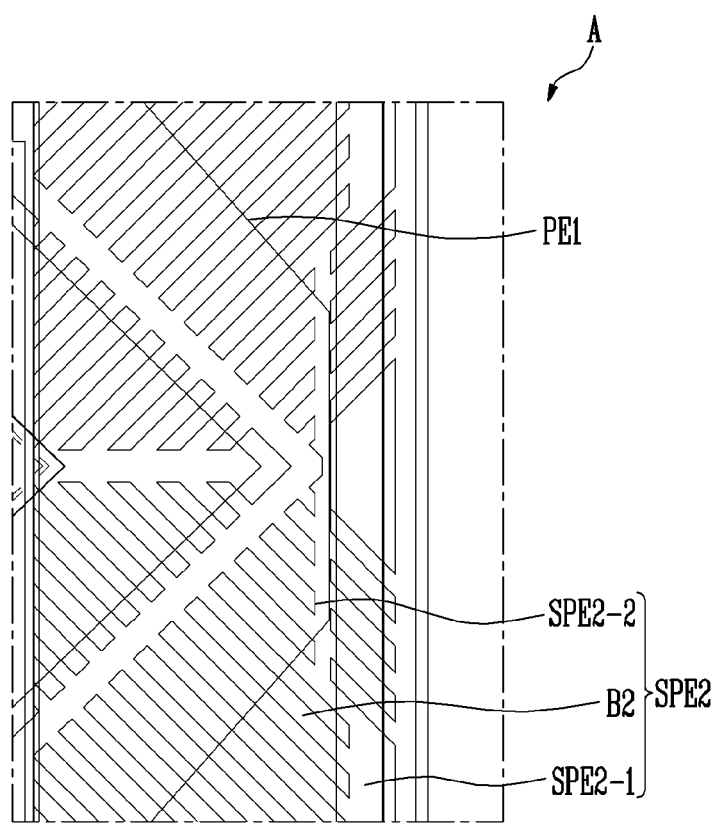
FIG. 5 is an enlarged view of an area A in FIG. 2.

FIG. 2 is a plane view for explaining a pixel of an LCD panel illustrated in FIG. 1, FIG. 3 is a cross-sectional view along line I-I', FIG. 4 is a cross-sectional view along line II-II', and FIG. 5 is an expanded view of an area A of FIG. 2.

Referring to FIGS. 2 to 5, the LCD panel 100 may include a first substrate 110, a second substrate 120 that faces the first substrate 110, and a liquid crystal layer LC disposed between the two substrates 110 and 120.

In an exemplary embodiment, the first substrate 110 may be a TFT array substrate where TFTs for driving liquid crystal molecules of the liquid crystal layer LC are disposed.

The first substrate 110 may include a first base substrate SUB1 having a pixel area. In an exemplary embodiment, the first base substrate SUB1 may be a rigid type base substrate, or a flexible type base substrate. In an exemplary embodiment, the rigid type base substrate may include at least one of a glass base substrate, quartz base substrate, glass ceramic base substrate, and crystalline glass base substrate, for example. In an exemplary embodiment, the flexible type base substrate may include at least one of a film base substrate and plastic base substrate that includes a high molecular organic substance. The substance applied to the first base substrate SUB1 may desirably have resistance (or thermal resistance) against high processing temperatures during manufacturing and processing.

On the first base substrate SUB1, a gate line GL may be arranged. The gate line GL may deliver a gate signal, and may extend in a first direction. A portion of the gate line GL may be first to third gate electrodes.

In an exemplary embodiment, on the first base substrate SUB1, a light blocking pattern LBP may be arranged extending in a second direction. In an exemplary embodiment, the second direction may be a direction that crosses the first direction. In an exemplary embodiment, the second direction may be substantially perpendicular to the first direction, for example. The light blocking pattern LBP may include a same substance as that of the gate line GL. The light blocking pattern LBP may be electrically insulated from the gate line GL.

On the gate line GL and the light blocking pattern LBP, a gate insulator GI may be arranged. In an exemplary embodiment, the gate insulator GI may include at least one of silicon oxide (SiOx) and silicon nitride (SiNx), for example.

On the gate insulator GI, first to third semiconductor layers SA1, SA2 and SA3 may be arranged. Although not illustrated in the drawings, in another exemplary embodiment, an ohmic contact layer may be arranged on the first to third semiconductor layers SA1, SA2 and SA3.

On the gate insulator GI and the first to third semiconductor layers SA1, SA2 and SA3, a data line DL, reference voltage line VL, first to third source electrodes SE1, SE2, SE3, and first to third drain electrodes DE1, DE2 and DE3 may be arranged. Therefore, three TFTs may be connected to the gate line GL and the data line DL.

In an exemplary embodiment, the data line DL may extend in the second direction, and may be connected to an external driving circuit.

The reference voltage line VL may extend in the second direction, and may overlap the light blocking pattern LBP.

On the data line DL, reference voltage line VL, first to third source electrodes SE1, SE2, SE3, and the first to third drain electrodes DE1, DE2 and DE3, a first protection film PSV1 may be arranged. In an exemplary embodiment, the first protection film PSV1 may include at least one of silicon oxide (SiOx) and silicon nitride (SiNx), for example.

On the first protection film PSV1, an organic insulating layer OIL may be arranged. In an exemplary embodiment, the organic insulating layer OIL may have a planarized surface. In an exemplary embodiment, the organic insulating layer OIL may be a color filter that includes dye, for example. In an exemplary embodiment, the color filter may be one of a red, green, and blue color filter, for example, but the invention is not limited thereto. In another exemplary embodiment, the color filter may be one of a cyan, magenta, and yellow color filter, for example.

On the organic insulating layer OIL, a second protection layer PSV2 may be arranged. The second protection film PSV2 may prevent the organic insulating layer OIL from being exposed. The second protection film PSV2 may include a same substance as that of the first protection film PSV1. That is, the second protection film PSV2 may include at least one of silicon oxide (SiOx) and silicon nitride (SiNx), for example.

On the second protection film PSV2, a first pixel electrode PE1 and shielding electrode S_com may be arranged. In an exemplary embodiment, the first pixel electrode PE1 and the shielding electrode S_com may include a same substance. In an exemplary embodiment, the first pixel electrode PE1 and the shielding electrode S_com may include a transparent conductive oxide, for example. In an exemplary embodiment, the transparent conductive oxide may include at least one of Indium Tin Oxide ("ITO"), Indium Zinc Oxide ("IZO"), Aluminum Zinc Oxide ("AZO"), gallium doped zinc oxide ("GZO"), zinc tin oxide ("ZTO"), Gallium tin oxide ("GTO") and fluorine doped tin oxide ("FTO"), for example.

The first pixel electrode PE1 may be connected to the first drain electrode DE through contact holes that penetrate the first protection film PSV1, organic insulating layer OIL, and second protection film PSV2.

In an exemplary embodiment, the first pixel electrode PE1 may have a hexagon shape.

Specifically, the first pixel electrode PE1 may have six sides. That is, the first pixel electrode PE1 may have a first side and second side that are parallel to one side of the pixel area, a third side and fourth side that extend from one side of the first side and the second side and inclined against the first side and the second side and are parallel to each other, and a fifth side and sixth side that connect the first and second sides with the third and fourth sides, and are parallel to each other. In an exemplary embodiment, the first to sixth sides may all have substantially a same length.

In an exemplary embodiment, the first pixel electrode PE1 may have therein a diamond shaped open unit OP, and a connecting unit CP that traverses the open unit OP. The connecting unit CP may overlap the reference voltage line VL.

The connecting unit CP may be connected to the reference voltage line VL through contact holes that penetrate the first protection film PSV1, organic insulating layer OIL, and second protection film PSV2.

The shielding electrode S_com may overlap the data line DL, and extend in the second direction. The shielding electrode S_com may prevent coupling between the data line DL and common electrode CE. Therefore, the shielding electrode S_com may prevent abnormal behavior of liquid crystal molecules inside the pixel area. In an exemplary embodiment, the shielding electrode S_com may increase a storage capacitance of the pixel area.

On the first pixel electrode PE1 and the shielding electrode S_com, a third protection film PSV3 may be arranged. That is, the third protection film PSV3 may cover the first pixel electrode PE1 and the shielding electrode S_com. In an exemplary embodiment, the third protection film PSV3 may include a same substance as that of the first protection film PSV1. That is, the third protection film PSV3 may include at least one of silicon oxide (SiOx) and silicon nitride (SiNx), for example.

On the third protection film PSV3, a second pixel electrode PE2 may be arranged. In an exemplary embodiment, the second pixel electrode PE2 may include a same substance as that of the first pixel electrode PEI.

In an exemplary embodiment, the second pixel electrode PE2 may have a shape of a plate, and may cover almost an entirety of the pixel area. The second pixel electrode PE2 may include a first subpixel electrode SPE1 having a shape corresponding to the open unit OP having a shape of a diamond, and a second subpixel electrode SPE2 in an outskirt of the first subpixel electrode SPE1. The first subpixel electrode SPE1 and the second subpixel electrode SPE2 may be distanced from each other.

An edge area of the first subpixel electrode SPE1 may overlap the first pixel electrode PE1. The first subpixel electrode SPE1 may include a cross-shaped stem unit SPE1-1 that includes a width stem unit and a length stem unit, and a plurality of first branch units B1 extending from the stem unit SPE1-1. In an exemplary embodiment, the first subpixel electrode SPE1 may be connected to the first subpixel electrode PE1 through a contact hole that penetrates the third protection film PSV3.

By the cross-shaped stem unit SPE1-1, the first subpixel electrode SPE1 may be differentiated into four sub-regions. In an exemplary embodiment, the first branch units B1 may be arranged on the sub-regions. In an exemplary embodiment, an acute angle between the first branch units B1 and the stem unit SPE1-1 may be about 35 degrees (°) to about 55°.

An inner edge area of the second subpixel electrode SPE2 may overlap the first subpixel electrode PE1. The second subpixel electrode SPE2 may be distanced from the first subpixel electrode SPE1 and be arranged in an outskirt of the first subpixel electrode SPE1. In an exemplary embodiment, the second subpixel electrode SPE2 may be connected to the second drain electrode DE2 through a contact hole that penetrates the first protection film PSV1, organic insulating layer OIL, the second protection film PSV2, and the third protection film PSV3.

The second subpixel electrode SPE2 may include a circumference unit SPE2-1 corresponding to a plate-shaped corner, a plurality of second branch units B2 that extend from the circumference unit SPE2-1, and connecting bars SPE2-2 that connect the second branch units B2 corresponding to the first and second sides S1 and S2.

In an exemplary embodiment, an acute angle between the second branch units B2 and the circumference unit SPE2-1 may be about 35° to about 55°.

The connecting bars SPE2-2 may extend parallel to the first and second sides S1 and S2. At least a portion of the connecting bars SPE2-2 may overlap the first and second sides S1 and S2. A length of the connecting bars SPE2-2 may be or greater than a length of the first and second sides S1 and S2.

In an exemplary embodiment, the connecting bars SPE2-2 may be arranged such that they are distanced from the shielding electrode S_com. In an exemplary embodiment, a distance between the connecting bars SPE2-2 and the shielding electrode S_com may be once or twice a width of the connecting bars SPE2-2, for example.

The connecting bars SPE2-2 may prevent direction vectors of arrangement of the liquid crystal molecules arranged correspondingly to the first and second sides S1 and S2 from colliding with one another. Therefore, the connecting bars SPE2-2 may prevent a texture phenomenon from occurring near the first and second sides S1 and S2 of the first pixel electrode PE1.

The second substrate 120 may be an opposed substrate facing the first substrate 110. The second substrate 120 may include a second base substrate SUB2 and common electrode CE.

The second base substrate SUB2 may include a same substance as that of the first base substrate SUB1.

The common electrode CE may be arranged on the second base substrate (SUB2). The common electrode CE may have a shape of a plate in the pixel area.

In an exemplary embodiment, the common electrode CE may include a same substance as that of the first pixel electrode PE1 and the second pixel electrode PE2. That is, the common electrode CE may include a transparent conductive oxide.

Between the second base substrate SUB2 and the common electrode CE, an overcoat layer (not illustrated) may be arranged. The overcoat layer may be arranged on a surface in a direction facing the first substrate 110 of the second base substrate SUB2. The overcoat layer may planarize a surface of the second base substrate SUB2.

The liquid crystal layer LC may include a plurality of liquid crystal molecules having dielectric anisotropy. The liquid crystal molecules may be arranged between the first substrate 110 and the second substrate 120. In an exemplary embodiment, the liquid crystal molecules are vertically oriented liquid crystal molecules arranged in a direction vertical to the two substrates 110 and 120. When an electric field is applied between the first substrate 110 and the second substrate 120, the liquid crystal molecules rotate in a certain direction between the first substrate 110 and the second substrate 120, thereby transmitting or blocking light. Herein, the term 'rotate' used in the specification refers to the liquid crystal molecules lying in a direction horizontal to the first substrate 110 or the second substrate 120. Otherwise, the liquid crystal molecules rotating may refer not only to the liquid crystal molecules actually rotating, but also to the orientation of the liquid crystal molecules being changed by the electric field.

Figure 6:
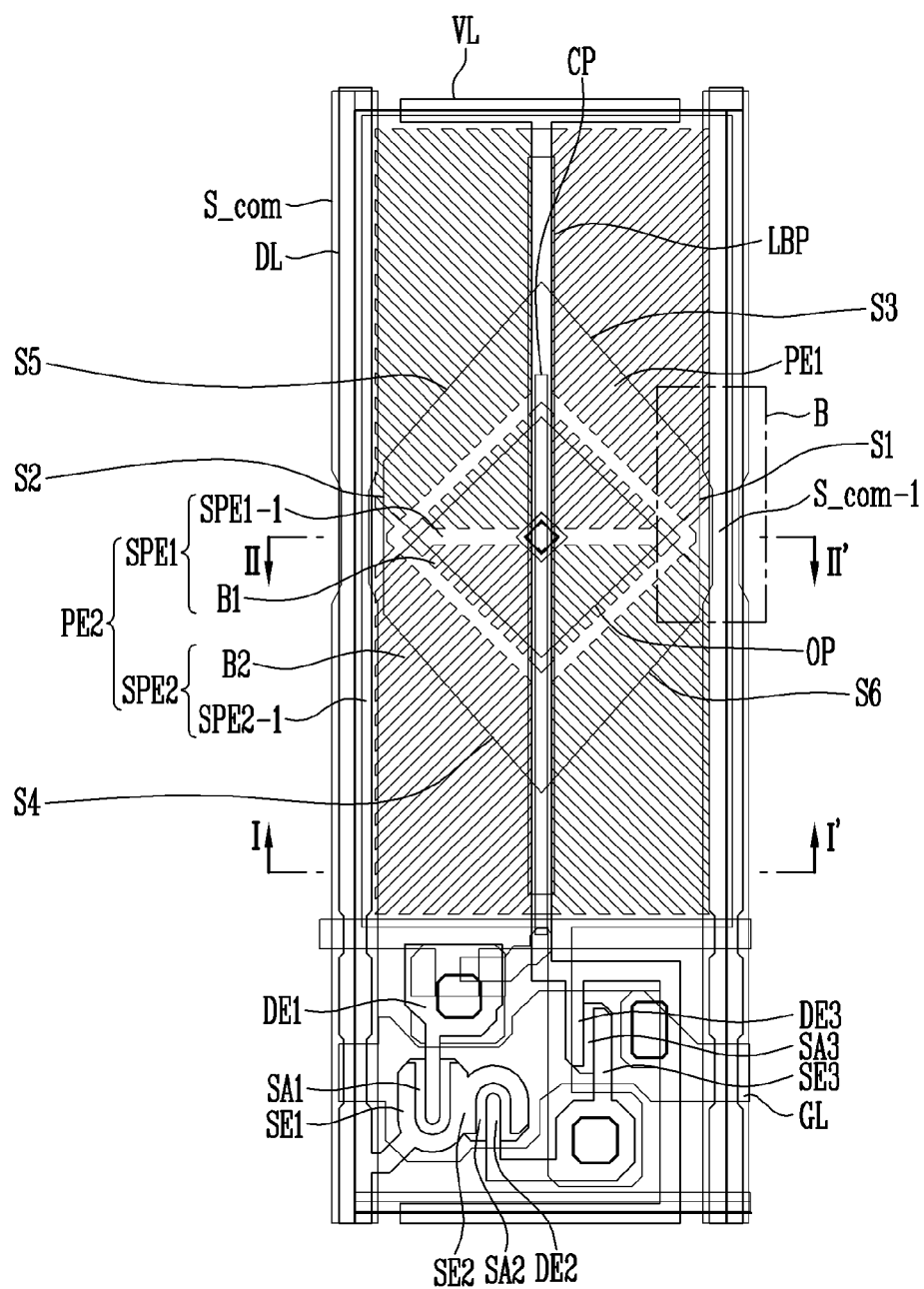
FIG. 6 is a plane view for explaining another embodiment of a pixel of an LCD panel of an LCD device according to the invention.
Figure 7:
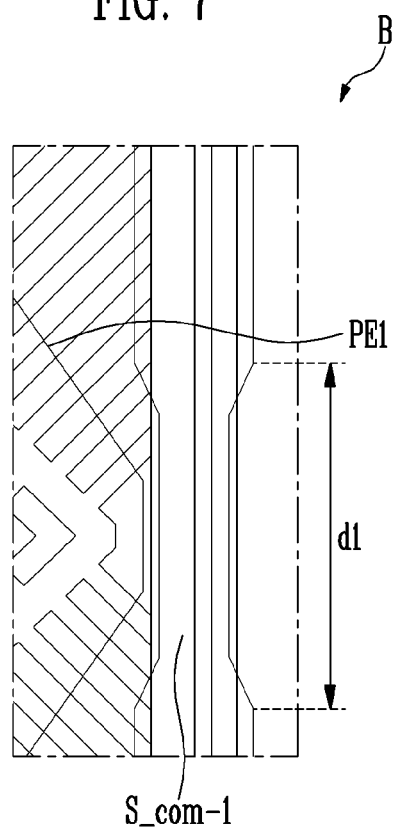
FIG. 7 is an enlarged view of an area B in FIG. 6.

Hereinafter, other embodiments of the invention will be explained with reference to FIGS. 6 and 7. In FIGS. 6 and 7, the same reference numerals are used for the components that correspond to those of FIGS. 1 to 5, and thus further explanation thereof is omitted. In an exemplary embodiment, in order to avoid redundancy of explanation, FIGS. 6 and 8 will be explained with a main focus on their differences from FIGS. 1 to 5.

FIG. 6 is a plane view for explaining a pixel of an LCD panel of the LCD device according to another embodiment of the invention, and FIG. 7 is an enlarged view of an area B of FIG. 6.

Referring to FIGS. 6 and 7, the LCD panel 100 may include a first substrate 110, a second substrate 120 facing the first substrate 110, and a liquid crystal layer LC disposed between the two substrates 110 and 120.

The first substrate 110 may include a first base substrate SUB1 having a pixel area, a gate line GL and data line DL arranged on the first base substrate SUB1, TFTs connected to the gate line GL and data line DL, and a first pixel electrode PE1 connected to any one of the TFTs and a second pixel electrode PE2 that is connected to another one of the TFTs.

The first pixel electrode PE1 may be arranged on a second protection film PSV2 that covers the TFTs. In an exemplary embodiment, on the second protection film PSV2, a shielding electrode S_com including a same substance as that of the first pixel electrode PE1 may be included.

In an exemplary embodiment, the first pixel electrode PE1 may have a hexagon shape, for example.

Specifically, the first pixel electrode PE1 may have six sides S1, S2, S3, S4, S5 and S6. That is, the first pixel electrode PE1 may have a first side S1 and second side S2 that are parallel to one side of the pixel area, a third side S3 and fourth side S4 that extend from one side of the first side Si and the second side S2 and inclined against the first side Si and the second side S2 and are parallel to each other, and a fifth side S5 and sixth side S6 that connect the first and second sides S1 and S2 with the third and fourth sides S3 and S4, and are parallel to each other. In an exemplary embodiment, the first to sixth sides S1, S2, S3, S4, S5 and S6 may all have substantially a same length, for example.

In an exemplary embodiment, the first pixel electrode PE1 may have therein a diamond shaped open unit OP, and a connecting unit CP that traverses the open unit OP. The connecting unit CP may overlap the reference voltage line VL.

The connecting unit CP may be connected to the reference voltage line VL through contact holes that penetrate the first protection film PSV1, organic insulating layer OIL, and second protection film PSV2.

The shielding electrode S_com may overlap the data line DL, and extend in the second direction. The shielding electrode S_com may overlap the data line DL and prevent coupling between the data line DL and common electrode CE. Therefore, the shielding electrode S_com may prevent abnormal behavior of liquid crystal molecules inside the pixel area. In an exemplary embodiment, the shielding electrode S_com may increase a storage capacitance of the pixel area.

The shielding electrode S_com may have a convex S_com-1 arranged on an area corresponding to the first and second sides S1 and S2. In an exemplary embodiment, a width of the convex S_com-1 taken along a horizontal direction may be smaller than a width of the shielding electrode S_com, for example. In an exemplary embodiment, a length dl of the convex S_com-1 taken along a vertical direction may be or greater than a length of the first and second side S1 and S2, for example.

In an exemplary embodiment, a distance between the first and second sides S1 and S2 and the shielding electrode S_com may be or less than the width of the convex S_com-1. Therefore, there is a low probability that liquid crystal molecules may be arranged between the first and second sides S1 and S2 and the shielding electrode S_com. Therefore, it is possible to prevent deterioration of transmission rate by a misarrangement of liquid crystal molecules between the first and second sides S1 and S2 and the shielding electrode S_com according to an exemplary embodiment of the invention. That is, an LCD panel according to the embodiment of the invention may prevent a texture phenomenon being caused by the deterioration of transmission rate.

In an exemplary embodiment, the second pixel electrode PE2 may have a shape of a plate, and may cover almost an entirety of the pixel area. The second pixel electrode PE2 may include a first subpixel electrode SPE2 having a shape corresponding to the open unit OP having a shape of a diamond, and a second subpixel electrode SPE2 in an outskirt of the first subpixel electrode SPE1. The first subpixel electrode SPE1 and the second subpixel electrode SPE2 may be distanced from each other.

An edge area of the first subpixel electrode SPE1 may overlap the first pixel electrode PEL The first subpixel electrode SPE1 may include a cross-shaped stem unit SPE1-1 that includes a width stem unit and a length stem unit, and a plurality of first branch units B1 extending from the stem unit SPE1-1. In an exemplary embodiment, the first subpixel electrode SPE1 may be connected to the first subpixel electrode PE1 through a contact hole that penetrates the third protection film PSV3.

By the cross-shaped stem unit SPE1-1, the first subpixel electrode SPE1 may be differentiated into four sub-regions. In an exemplary embodiment, the first branch units B1 may be arranged on the sub-regions. In an exemplary embodiment, an acute angle between the first branch units B1 and the stem unit SPE1-1 may be about 35° to about 55°.

An inner edge area of the second subpixel electrode SPE2 may overlap the first subpixel electrode PE1. The second subpixel electrode SPE2 may be distanced from the first subpixel electrode SPE1 and be arranged in an outskirt of the first subpixel electrode SPE1. In an exemplary embodiment, the second subpixel electrode SPE2 may be connected to a second drain electrode DE2 through a contact hole that penetrates the first protection film PSV1, organic insulating layer OIL, the second protection film PSV2, and the third protection film PSV3.

In an exemplary embodiment, the second subpixel electrode SPE2 may include a circumference unit SPE2-1 corresponding to a plate-shaped corner, and a plurality of second branch units B2 that extend from the circumference unit SPE2-1. In an exemplary embodiment, the circumference unit SPE2-1 may overlap the first and second sides S1 and S2.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A liquid crystal display device comprising:
a first substrate comprising a pixel area;
a second substrate comprising a common electrode, and facing the first substrate; and
a liquid crystal layer disposed between the first substrate and the second substrate,
wherein the first substrate further comprises a first pixel electrode arranged in the pixel area, and having a diamond shaped open unit therein; and
a second pixel electrode disposed on the first pixel electrode,
wherein the first pixel electrode comprises:
first and second sides parallel to one side of the pixel area;
third and fourth sides extending from one side of the first and second sides, inclined against the first and second sides, and parallel to each other; and
fifth and sixth sides connecting the first and second sides with the third and fourth sides, and parallel to each other, and each of the first, second, third, fourth, fifth and sixth sides extend in a single direction along a length defining the respective edge, and
wherein the second pixel electrode comprises:
a first subpixel electrode overlapping the open unit of the first pixel electrode, and comprising:
a cross-shaped stem unit and a plurality of first branch units extending slantly against the cross-shaped stem unit;
a second subpixel electrode which is distanced from the first subpixel electrode in an outskirt of the first subpixel electrode, and comprising a circumference unit comprising a plate shape corner and a plurality of second branch units extending slantly against the circumference unit; and
connecting bars connecting the plurality of second branch units corresponding to the first and second sides.

2. The liquid crystal display device according to claim 1, wherein the connecting bars extend parallel to the first and second sides.

3. The liquid crystal display device according to claim 2, wherein at least a portion of the connecting bars overlap the first and second sides.

4. The liquid crystal display device according to claim 3, wherein a length of the connecting bars is equal to or greater than a length of the first and second sides.

5. The liquid crystal display device according to claim 4, further comprising:
a data line extending in one direction from the one side of the pixel area; and
a shielding electrode overlapping the data line.

6. The liquid crystal display device according to claim 5, wherein the shielding electrode comprises a same substance as that of the first pixel electrode.

7. The liquid crystal display device according to claim 6, wherein a distance between the connecting bars and the shielding electrode is once or twice a width of the connecting bars.

8. The liquid crystal display device according to claim 7, wherein an edge area of the first subpixel electrode overlaps the first pixel electrode.

9. The liquid crystal display device according to claim 8, wherein an inner edge area of the second subpixel electrode overlaps the first pixel electrode.

10. A liquid crystal display device comprising:
a first substrate comprising a pixel area;
a second substrate facing the first substrate; and
a liquid crystal layer disposed between the first substrate and the second substrate, wherein the first substrate further comprises:
a gate line disposed on a first base substrate;
a data line crossing and insulated from the gate line;
a plurality of thin film transistors electrically switching the gate line and the data line;
a first protection film covering the plurality of thin film transistors;
a first pixel electrode which is disposed on the protection film, and is connected to one of the plurality of thin film transistors;
a shielding electrode which is disposed on the protection film, overlaps the data line and blocks an electric field;
a second protection film covering the first pixel electrode and the shielding electrode; and
a second pixel electrode disposed on the second protection film, and connected to another one of the plurality of thin film transistors, wherein the first pixel electrode comprises:
first and second sides parallel to one side of the pixel area;
third and fourth sides extending from one side of the first and second sides, and inclined against the first and second sides, and parallel to each other; and
fifth and sixth sides connecting the first and second sides with the third and fourth sides, and are parallel to each other, and each of the first, second, third, fourth, fifth and sixth sides extend in a single direction along a length defining the respective edge, and
wherein the second pixel electrode comprises:
a first subpixel electrode overlapping an open unit of the first pixel electrode, and comprising a cross-shaped stem unit and a plurality of first branch units which extends slantly against the stem unit;
a second subpixel electrode which is distanced from the first subpixel electrode in an outskirt of the first subpixel electrode, and comprising a circumference unit comprising the plate shape corner and a plurality of second branch units extending slantly against the circumference unit; and connecting bars connecting the plurality of second branch units corresponding to the first and second sides.

11. The liquid crystal display device according to claim 10, wherein the connecting bars extend parallel to the first and second sides, and at least a portion of the connecting bars overlap the first and second sides.

12. The liquid crystal display device according to claim 11, wherein a length of the connecting bars is or greater than a length of the first and second sides.

13. The liquid crystal display device according to claim 11, wherein the first pixel electrode and the shielding electrode comprise a same substance.

14. The liquid crystal display device according to claim 13, wherein a distance between the connecting bars and the shielding electrode is once or twice a width of the connecting bars.

* * * * *